Feb. 24, 1959 K. L. WADE 2,874,385
EYE SHIELD
Filed July 7, 1955

INVENTOR
KENNETH L. WADE
BY
Stephen J. Rudy
ATTORNEY

United States Patent Office 2,874,385
Patented Feb. 24, 1959

2,874,385

EYE SHIELD

Kenneth L. Wade, New York, N. Y.

Application July 7, 1955, Serial No. 520,426

2 Claims. (Cl. 2—15)

This invention relates to eye shields, more particularly, to an eye shield for excluding light rays and other rays, such as ultra-violet rays, from the eyes of the user of the shield.

It is important in eye shields that there be a relatively complete exclusion of rays, if the shield is to function satisfactorily. To obtain such a result, it is common practice to provide padding, adjustable or otherwise, on the edge of the shield on the underside thereof, particularly in the region of the intersection of the nose and cheeks of the shield user. Another important requirement is that the shield be of light weight, as to be comfortable in use. In addition, it is desirable that the shield be simple in design, easy to use, and of low cost.

The eye shield of the invention satisfies such requirements. Briefly, the eye shield of the invention comprises an envelope-type container, preferably made of a light weight fabric, a moldable opaque element, such as a thin metallic sheet, which is maintained in the container, and a pair of cords affixed to the ends of the shield for maintaining the shield in adjusted position over the eyes of the user thereof. The eye shield is made completely effective against passage of light rays, or other rays, to the wearer's eyes, by molding the shield to fit the contour of the user's face in the region of the eyes, thus providing a light-excluding fit. Such molding is done when the shield is in position on the user's face.

The main object of this invention is to provide an eye shield which will effectively restrict passage of light rays to the eyes of the user of the shield.

Another object of this invention is to provide an eye shield which can be adapted to restrict passage of ultraviolet, and other such type of radiation, to the eyes of the user of the shield.

Another object is to provide an eye shield that may be molded to provide a light-excluding fit in the region of the eyes of the user of the shield.

Another object is to provide an eye shield that can be readily adjusted to give satisfactory service to any person regardless of head size, or shape.

Other objects are to provide an eye shield that is simple in design, easy to use, and of low cost.

These and further objects and features of the invention will become more apparent from a study of the following description and the accompanying drawing, wherein.

Figure 3:
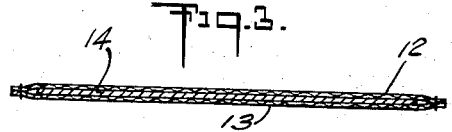
Fig. 3 is an enlarged section view as seen from line 3—3 of Fig. 2.
Figure 6:
Fig. 6 is an enlarged section view as seen from line 6—6 in Fig. 5.
Figure 4:
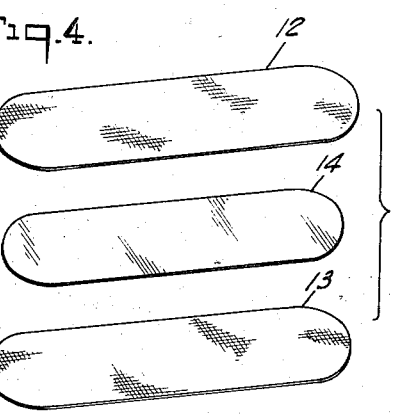
Fig. 4 is an exploded view illustrating certain elements forming the eye shield of Fig. 2.

It may be mentioned that the scale of the various figures varies, only that of Figs. 3 and 6 being what may be considered full size.

Figure 1:
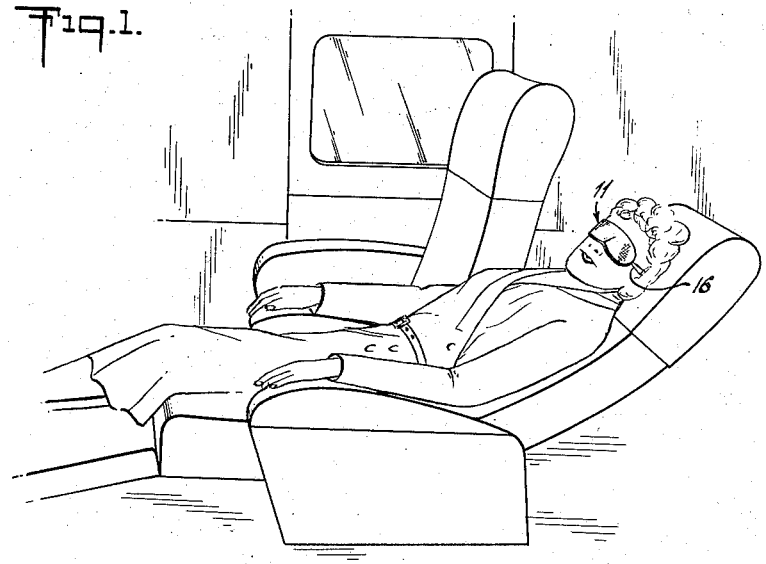
Fig. 1 is a pictorial representation of an eye shield of the invention in position upon a user of the shield.
Figure 2:
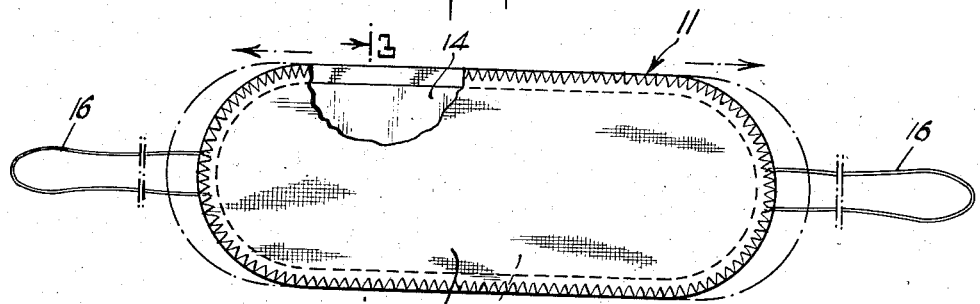
Fig. 2 is a plan view, partly broken away, of the eye shield of the invention.

Referring now to the drawing, numeral 11 indicates an eye shield illustrative of an embodiment of the invention, which shield includes two elongated plies, or flat elements 12, 13, which are preferably made of a light weight fabric, or cloth, and a soft, non-resilient, deformable material, or moldable opaque element 14, such as a metallic sheet, made of lead or aluminum. The fabric elements 12, 13, are secured together about the edges, such as by sewing thus forming a holder, or envelope to hold, or contain the moldable element 14. A pair of looped cords 16, are affixed to the ends of the shield such cords being hooked on to the ears of the user when the shield is in use. The length of the looped cords may be made of elastic cord, which may be adjusted to provide a snug fit of the shield to the user's face. The element 14 may be of somewhat smaller size than the elements 12, 13, so that it may have slight movement within the fabric envelope, or it may be of the same size as the elements 12, 13 and be sewn to the latter about the edge thereof. If the insert, or moldable element 14 is free to move within the envelope container, the material of the elements 12, 13 should preferably be stretchable along the major axis, as indicated by the arrows in Fig. 2.

Figure 5:
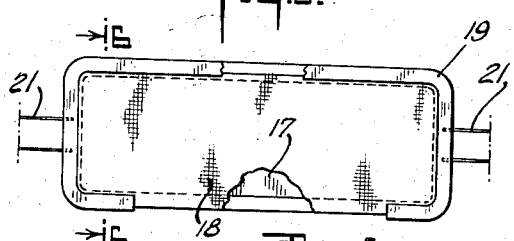
Fig. 5 is a plan view of an eye shield representing a modified form of the invention.

In Fig. 5 is shown a modification of the eye shield of the invention, which differs from that above disclosed primarily in the details of construction. The modified shield comprises a moldable opaque insert, or moldable element 17, similar to insert 14, a light weight fabric, or cloth, 18 which is folded longitudinally along the lower edge, and encloses the insert 17, and a heat setting binding 19, which extends around the major portion of the edge of the shield, as shown in Fig. 5, and which serves to keep the shield in assembled condition. A pair of looped cords 21 are affixed to the ends of the shield, in the same manner, and for the same purpose as the cords 16 in the shield of Fig. 2.

The eye shield of the invention will be found adaptable, comfortable, and very effective in use. It may be used as an aid in sleeping in lighted quarters, at home, while traveling, or when sun bathing, and may be adapted for protection of the eyes against X-rays during medical treatment.

While I have shown and described the manner of utilizing the principles of my invention, it may occur to others that certain variations of structure may be possible, hence I do not wish to be limited to the illustrative embodiments set forth, but rather to the appended claims which clearly define the scope of the invention.

What I claim is:

1. An eye shield comprising an elongated container of greater length than width composed of inner and outer plies, said plies being secured together, an insert positioned within said container and being substantially coextensive therewith, said insert being made of a soft opaque non-resilient deformable material of the group consisting of lead and aluminum, said insert being adapted to be manually molded to the contours of the eyes, nose and forehead of the shield user, and means to maintain the shield in molded condition over the eyes of the user of the shield.

2. An eye shield which is impervious to rays, comprising an elongated holder adapted to extend over both eyes of a user of the shield, said holder being formed of a cloth-like material, a generally thin metallic moldable sheet material formed substantially coextensive with said holder and being held thereby, said sheet material being manually deformable for molding to the contours of the user's face in the region of the eyes, nose and forehead whereby rays coming from any angle relative to the user's face will be blocked from passage to the user's eyes, and means to maintain the shield in its molded condition over the eyes of the user of the shield.

References Cited in the file of this patent

UNITED STATES PATENTS

| | | |
|---|---|---|
| 591,244 | Wylie | Oct. 5, 1897 |
| 944,767 | Blackstock | Dec. 28, 1909 |
| 1,207,574 | Lewis | Dec. 5, 1916 |
| 1,807,475 | Gibson | May 26, 1931 |
| 1,924,315 | Hemphill et al. | Aug. 29, 1933 |